United States Patent [19]

Baraz et al.

[11] Patent Number: 5,721,927
[45] Date of Patent: Feb. 24, 1998

[54] METHOD FOR VERIFYING CONTIQUITY OF A BINARY TRANSLATED BLOCK OF INSTRUCTIONS BY ATTACHING A COMPARE AND/OR BRANCH INSTRUCTION TO PREDECESSOR BLOCK OF INSTRUCTIONS

[75] Inventors: Leonid Baraz, Kiryat Ata; Yaron Farber, Haifa, both of Israel

[73] Assignee: Intel Corporation, Santa Clara, Calif.

[21] Appl. No.: 689,357

[22] Filed: Aug. 7, 1996

[51] Int. Cl.[6] ................................................ G06F 9/32
[52] U.S. Cl. ........................ 395/705; 395/706; 395/385; 395/379; 395/581; 395/676
[58] Field of Search .................................. 395/500, 705, 395/706, 385, 379, 580, 581, 676

[56] References Cited

U.S. PATENT DOCUMENTS

| | | | |
|---|---|---|---|
| 5,167,023 | 11/1992 | De Nicolas et al. | 395/527 |
| 5,287,490 | 2/1994 | Sites | 395/500 |
| 5,560,013 | 9/1996 | Scalzi et al. | 395/705 |
| 5,619,665 | 4/1997 | Emma | 395/384 |

*Primary Examiner*—William M. Treat
*Assistant Examiner*—Gautam R. Patel
*Attorney, Agent, or Firm*—Blakely, Sokoloff, Taylor & Zafman

[57] ABSTRACT

A method for enabling a first block of instructions to verify whether the first block of instructions follows a second block of instructions in an order of execution. The method includes appending a compare instruction to the first block of instructions. The compare instruction compares a first value from the first block of instructions with a second value from the second block of instructions, which precedes the first block of instructions in the order of execution. The method further includes appending a branching instruction to the first block of instructions. The branching instruction is executed in response to the first value being unequal to the second value. The branching instruction, when executed, branches to an alternative look-up routine to obtain a block of instructions that follows the second block of instructions in the order of execution.

14 Claims, 3 Drawing Sheets

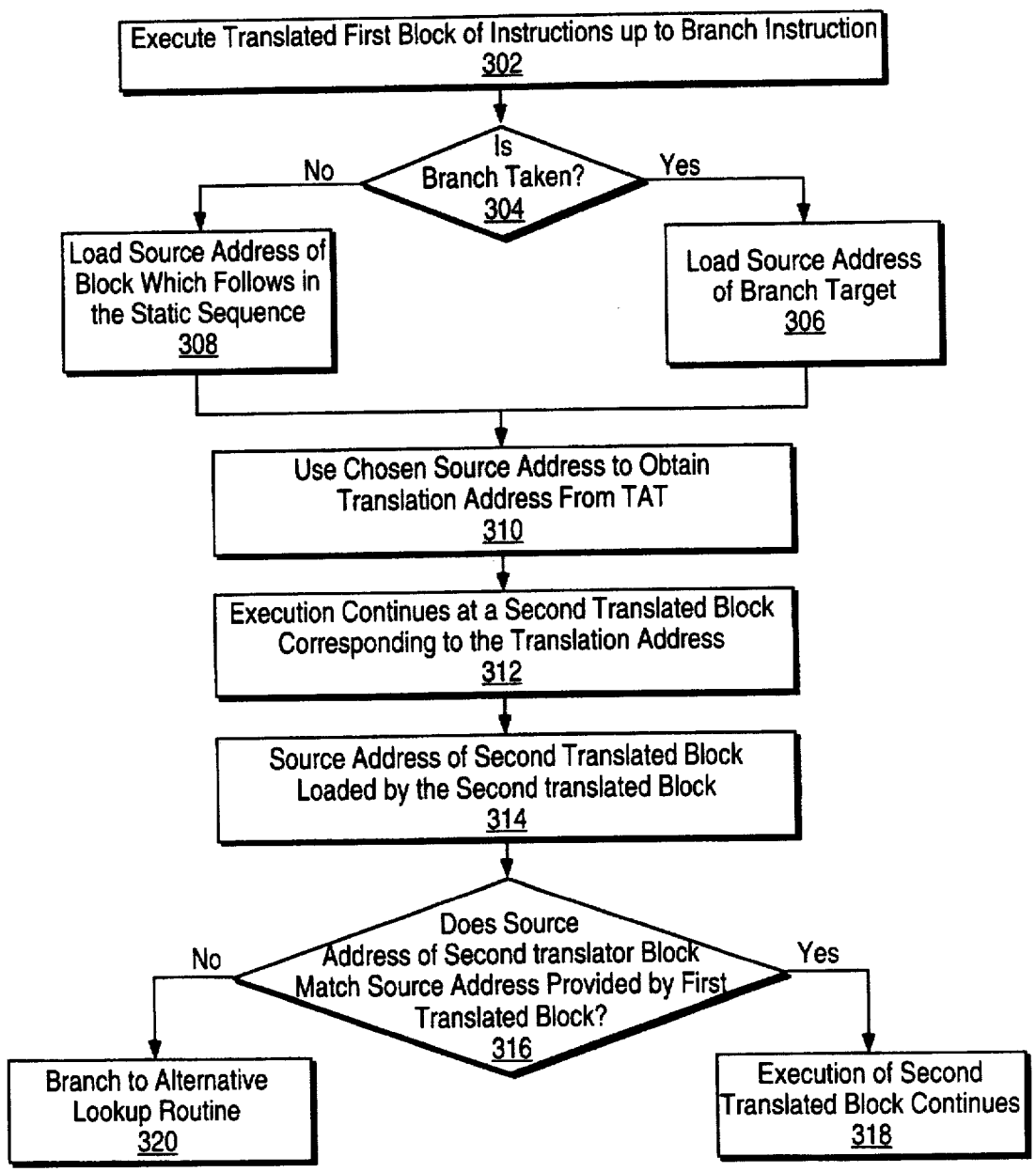

METHOD FOR VERIFYING CONTIQUITY OF A BINARY TRANSLATED BLOCK OF INSTRUCTIONS BY ATTACHING A COMPARE AND/OR BRANCH INSTRUCTION TO PREDECESSOR BLOCK OF INSTRUCTIONS

FIELD OF THE INVENTION

The invention relates to computer systems, and, in particular, increasing the performance of verifying binary translated blocks of instructions.

BACKGROUND OF THE INVENTION

Most often, computer program statements are decoded into machine instructions that a microprocessor can recognize and execute. The machine instructions are selected from a set of machine instructions unique to a particular instruction set architecture.

Computer program statements that have been decoded into machine instructions for a source instruction set computer architecture, such as the Intel ® X86, may undergo a binary translation in order to be executed on a target instruction set computer architecture, such as the reduced instruction-set computer (RISC) architecture or the very long instruction word (VLIW) architecture.

The machine instructions are typically translated and stored in memory in a separate block of instructions. Each block of instructions consist of a contiguous sequence of non-branch machine-instructions ending with a branch instruction. A computer program, such as the Untranslated Source program of FIG. 1, typically consists of multiple blocks of instructions stored in a physical static sequence (e.g., $BB_1$, $BB_2$, $BB_3$...)

The order that the blocks of instructions are executed (i.e. order of execution) can be different from the static sequence. The execution order is determined by the behavior of the branch instructions in the block of instructions.

When the branch instruction is taken, the order of execution branches (i.e., transfers) to a separate block of instructions that is separate in the static sequence of the program. Otherwise, the order of execution continues at the block of instructions that immediately follows in the static sequence. Consider, for example, in the Untranslated Source Program shown in FIG. 1, if the branch instruction of $BB_1$ is taken, the order of execution branches from $BB_1$ to $BB_3$. $BB_2$, therefore, is not executed in the example order of execution.

The block of instructions from which the order of execution continues from is hereinafter referred to as a "predecessor" block of instructions, regardless whether the branch is taken. In the given order of execution example above, $BB_1$ would be considered a predecessor block of instructions with respect to $BB_3$.

To continue the order of execution when executing a binary translation of a program, a predecessor block of instructions needs to obtain a memory address for the translation of a block of instructions that follows in the order of execution. The memory address of a translated block of instructions is hereinafter referred to as the translation address.

The speed of obtaining translation addresses is increased by storing translation addresses in a special section of memory referred to as the Translated Address Table (TAT), such as the one shown in the memory of FIG. 1.

If a translation address is not found in the TAT, a slower alternative look-up routine is accessed. The alternative look-up routine typically involves searching the contents of a larger data structure in memory, which stores a greater number of translation addresses.

The translation addresses stored in the TAT are typically indexed by the hash values of the memory addresses for the corresponding block of instructions untranslated (hereinafter referred to as the source addresses). Consider the example of using the 12 least significant bits (LSB) of source addresses to index the entries of the TAT. If a particular block of instructions has a source address with the 12 LSB equal to 25, than the translation address for that block of instructions would be stored at the 25th entry of the TAT.

It is possible, however, for the source addresses of two or more blocks of instructions to have the same hash value. As such, it is necessary to verify that a translation address obtained from the TAT is the correct translation address for the block of instructions that is to follow a predecessor block of instructions in the order of execution.

SUMMARY AND OBJECTS OF THE INVENTION

The present invention provides a method for enabling a first block of instructions to verify whether the first block of instructions follows a second block of instructions in an order of execution. The method includes appending a compare instruction to the first block of instructions. The compare instruction compares a first value from the first block of instructions with a second value from the second block of instructions, which precedes the first block of instructions in the order of execution. The method further includes appending a branching instruction to the first block of instructions. The branching instruction is executed in response to the first value being unequal to the second value. The branching instruction, when executed, branches to an alternative look-up routine to obtain a block of instructions that follows the second block of instructions in the order of execution.

BRIEF DESCRIPTION OF THE DRAWINGS

One embodiment of the invention is illustrated by way of example and not limitation in the figures of the accompanying drawings, in which like references indicate similar elements, and in which:

FIG. 3 is a flow diagram describing the steps of performing one embodiment of the present invention.

DETAILED DESCRIPTION

A method is described for increasing the performance of verifying whether a binary translated block of instructions follows a predecessor translated block of instructions in the order of execution.

Figure 1:
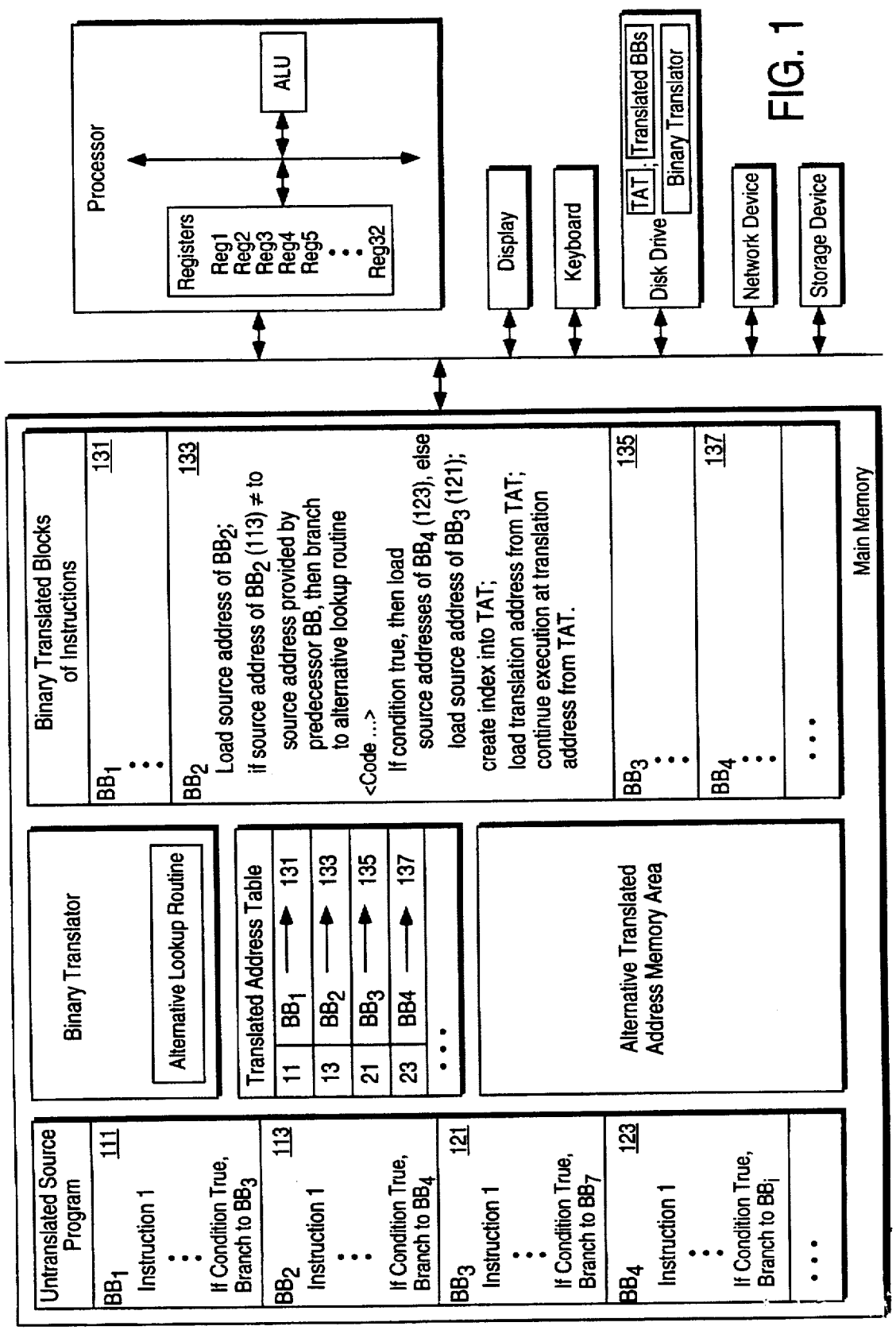
FIG. 1 illustrates a computer system capable of implementing one embodiment of the present invention.

Shown in FIG. 1, is a target instruction set computer architecture capable of performing the present invention. Included in the memory of FIG. 1 is the Untranslated Source Program consisting of multiple untranslated blocks of instructions. These blocks of instructions are executable on a separate source instruction set computer architecture.

The binary translator, also shown in the memory of FIG. 1, translates the untranslated blocks of instructions, block by block, so that the instructions are executable on the target instruction set computer architecture. The translator translates each untranslated instruction by decoding each untranslated instruction into an opcode and operands. The opcode indicates an operation to be performed by the instruction, and the operands identify the memory or register addresses of data to be operated on by the opcode.

The translator then provides a separate sequence of instructions in place of a decoded instruction's opcode. The instructions provided by the translator are selected from the target instruction set computer architecture's instruction set and typically achieve the same operation as the decoded instruction's opcode. The translator also translates the memory addresses of the decoded instruction's operands to be compatible with the target computer architecture memory addressing. In addition, in one embodiment of the invention, the translator appends to the translated block of instructions additional instructions that enable a translated block of instructions to verify whether it is the correct translated block of instructions following the predecessor block of instructions in the order of execution.

After the translator has translated a block of instructions to be executable on the target instruction set computer architecture, the translated block of instructions are stored in the area of memory allocated for storing Binary Translated Blocks of Instructions, shown in FIG. 1. Afterwards, during the execution of the translated blocks of instructions, the memory address for each translated block of instructions (i.e., translation address) is obtained from the Translation Address Table, also shown in the memory of FIG. 1.

The binary translator, Untranslated Source Program, binary Translated Blocks of Instructions, and the TAT shown stored in the memory, can also be stored on other computer-readable mediums, such as magnetic disks or optical disks, accessible via a disk drive. These items may also be stored on a cache memory.

Figure 2:
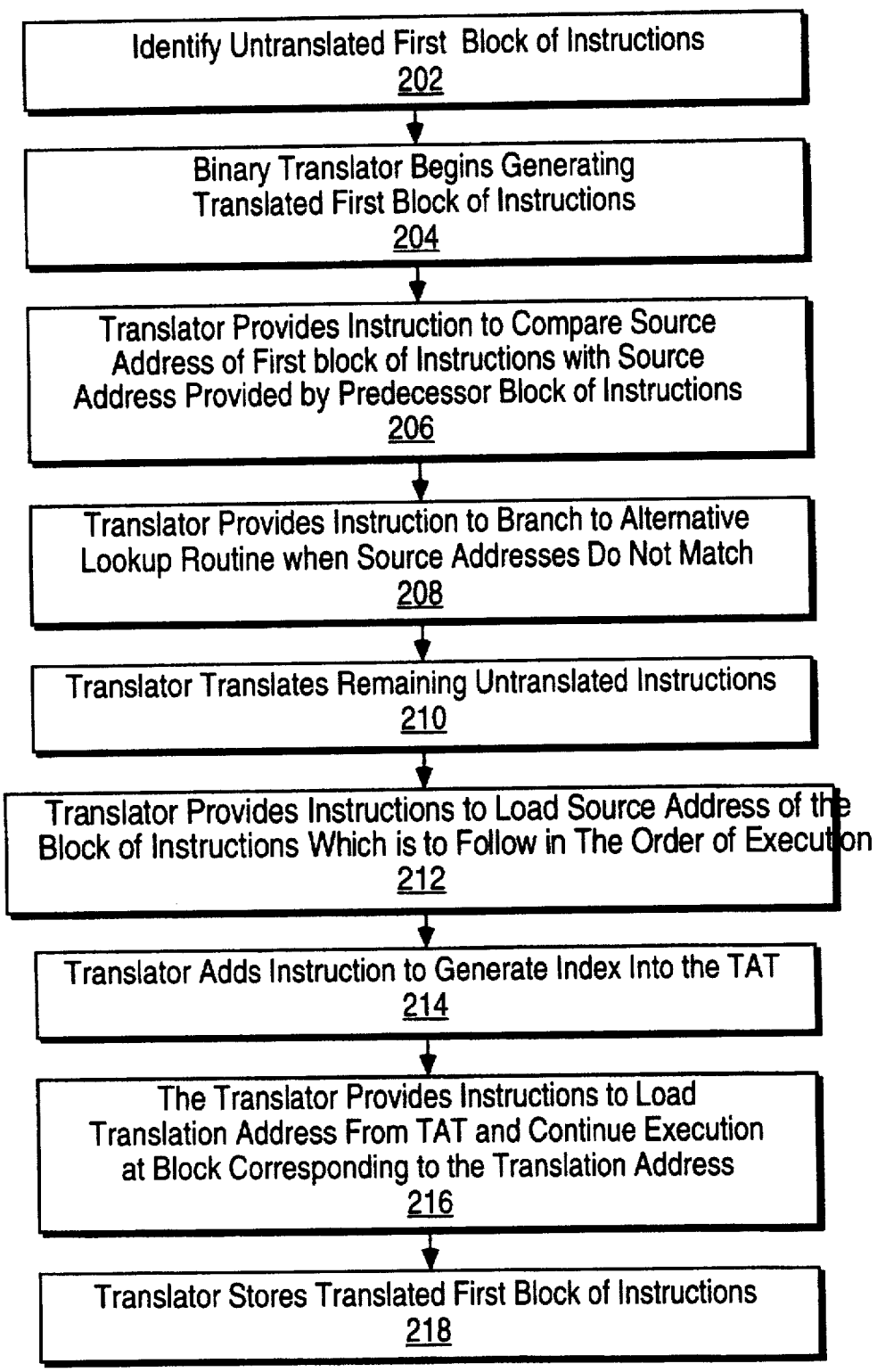
FIG. 2 is a flow diagram describing the steps of implementing one embodiment of the present invention.

Referring to FIG. 2, a flow diagram is shown describing the steps of translator enabling a translated block of instructions to verify whether it is the correct translated block of instructions following a translated predecessor block of instructions in an order of execution, according to one embodiment of the present invention.

In block 202, an untranslated first block of instructions is identified by a program counter during the translation of an untranslated program. In block 204, the binary translator begins translating the untranslated first block instructions into a translated block of instructions that is executable with the target instruction set computer architecture. The translation may be performed dynamically during the execution of the untranslated block of instructions, or statically when the block of instructions is not being executed.

In block 206, the translator provides a compare instruction to have the first block of instructions compare its source address with a source address provided by a predecessor block of instructions. The source address provided by the predecessor block of instructions is the source address of the block of instructions that should follow the predecessor block of instructions in the order of execution.

In block 208, the translator provides to the first block of instructions a branching instruction to branch to an alternative look-up routine if the source address of the first block of instructions is not equal to the source address provided by the predecessor block of instructions.

In one embodiment of the present invention, the alternative look-up routine is a procedure stored in the binary translator. The alternative look-up routine may obtain the translation addresses by searching a larger section of memory allocated to storing translation addresses of binary translated blocks of instructions (hereinafter referred to as the Alternative Translation Address Memory Area) as shown in the memory of FIG. 1.

In block 210 the translator sequentially performs a binary translation of each remaining untranslated instruction included in the first block of instructions.

In block 212, the translator provides to the first block of instructions, a loading instruction to load the source address of the block of instructions that is to follow the first block of instructions in the order of execution. The source address is typically loaded into a memory location that may be a register of a processor, a cache memory location, or a main memory address location.

The actual source address that is loaded depends on the results of the conditional branch instruction when executing the first block of instructions. If the branch is to be taken, then source address for the block of instructions that is a branch target of the first block of instructions is loaded. Otherwise, the source address of the block for instructions that follows the first block of instructions in the static sequence of the Untranslated Source Program.

For example, in FIG. 1, if the conditional branch instruction of the translated $BB_2$ is taken then the source address for $BB_4$ is loaded. On the other hand, if the conditional branch instruction of $BB_2$ is not taken, then the source address for $BB_3$ is loaded.

Therefore, when executing the translated blocks of instructions, the source address loaded by the first block of instructions can subsequently be used by a second translated block of instructions to verify whether the second translated block of instructions correctly follows the first block of instructions in the order of execution. As will be further explained, the second translated block of instructions compares its source address with the source address provided by the first block of instructions to perform the verification.

In block 214, the translator adds an instruction, to the first block of instructions, to generate an index into the TAT. The index is used to obtain the translation address for the block of instructions that is to follow in the order of execution.

In one embodiment, the index generated is a hash value of the source address loaded by the first block of instructions. The hash value generated is the 12 LSB of the source address. The 12 LSB of the source address is then used to locate an entry in the TAT corresponding to the 12 LSB. In alternative embodiments, other hash values may be generated from the source address loaded by the first block of instructions without departing from the scope of the invention.

In the present invention, the entries of the TAT only include translation addresses. The TAT entries do not include source addresses. Therefore, the TAT consumes less memory space.

In block 216, the translator provides instructions, to the first block of instructions to use the hash value generated in block 214 and fetch a translation address from the TAT. The order of execution continues at the block of instructions corresponding to the translation address obtained from the TAT.

In block 218, the translator stores the translated first block of instructions, including the instructions appended to the first translated block of instruction by the Translator in blocks 206–216, in the area of memory allocated for storing Binary Translated blocks of instructions. The translation address of the translated first block of instructions is stored in the Alternative Translated Address Memory Area. In one embodiment, when executing the binary translated blocks of instructions, the translation address for the translated first block of instructions may be copied from the Alternative Translated Address Memory Area into the TAT if the translated first block of instructions is considered to be frequently used.

In alternative embodiments the instructions appended to the block of instructions during the translation could be appended in an order other than the order described in blocks 206–216 without departing from the scope of the invention.

Referring to FIG. 3, a flow diagram is shown describing the steps of a translated block of instructions verifying whether it is the correct translated block of instructions following a translated predecessor block of instructions in an order of execution according to one embodiment of the present invention.

In block 302, a first translated block of instructions is executed on the target instruction set computer architecture up to the branch instruction. In decision block 304, it is determined whether the branch is to be taken. If the branch is to be taken, in block 306 the first translated block of instructions loads the source address for the block of instructions that is a branch target of the first block of instructions. Otherwise, in block 308 the first translated block of instructions loads the source address for the block of instructions that follows the first block in the static sequence of an untranslated source program.

In block 310, the translated first block of instructions generates a hash value of the source address chosen in either block 306 or 308 in order to find an entry in the TAT to obtain a translation address of a block of instructions that is expected to follow in the order of execution. If no translation address is stored in the entry of the TAT corresponding to the hash value of the chosen source address, then the TAT provides an address defaulting to the alternative look-up routine.

In block 312, execution of the program continues at a second translated block of instructions corresponding to a translation address obtained from the TAT. In block 314, the second translated block of instructions loads a copy of its source address into a register or other memory location. In decision block 316, the second translated block of instructions compares its source address with the source address provided by the first translated block of instructions.

If the source addresses are equal, the second block of instructions correctly follows the first block of instructions in the order of execution. Therefore, in block 318 execution of the second translated block of instructions continues.

If the source addresses are not equal, the second translated block of instructions does not follow the first block instructions in the order of execution. Therefore, in block 320 the second block of instructions branches into the alternative look-up routine in order to find the correct translated block of instructions that follows the first block of instructions in the order of execution.

In alternative embodiments, the order in which the second translated block of instructions verifies whether it is the correct block of instructions following the first translated block of instructions in the order of execution can vary from the order described in blocks 302–320 without departing from the scope of the invention.

By enabling a translated block of instructions to verify whether it is the correct translated block of instructions following a translated predecessor block of instructions in an order of execution, the scheduling parallelism may be improved when executed on a multiscalar machine. For example, the instructions in the translated predecessor block of instructions which cause the branch into the next block of instructions can be scheduled concurrently with the main body of the translated predecessor block of instructions because validation is necessary prior to branching into the next block of instructions.

In the foregoing specification the invention has been described with reference to specific exemplary embodiments thereof. It will however, be evident that various modifications and changes may be made thereto without departing from the broader spirit and scope of the invention. The specification and drawings are, accordingly, to be regarded in an illustrative rather than restrictive sense.

What is claimed is:

1. A computer-implemented method for enabling a first block of instructions to verify whether the first block of instructions follows a second block of instructions in an order of execution the method comprising the steps of:
   a) appending a compare instruction to the first block of instructions, the compare instruction when executed compares a first value from the first block of instructions with a second value from the second block of instructions, said second block of instructions preceding said first block of instructions in the order of execution; and
   b) appending a branching instruction to the first block of instructions, said branching instruction is executed in response to the first value being unequal to the second value, said branching instruction, when executed, branches to an alternative look-up routine to obtain a block of instructions that follows the second block of instructions in the order of execution.

2. The computer-implemented method of claim 1, further including the step of:
   c) appending a load instruction to the second block of instructions, the load instruction when executed loads the second value in a memory location.

3. The computer-implemented method of claim 2, wherein the compare and branching instructions are appended to the first block of instructions when the first block of instructions is translated from being executable on a source instruction set computer architecture to being executable on a target instruction set computer architecture; and
   the load instruction is appended to the second block of instructions when the second block of instructions is translated from being executable on the source instruction set computer architecture to being executable on the target instruction set computer architecture.

4. The computer-implemented method of claim 3, wherein the first value is a memory address for the first block of instructions executable on the source instruction set computer architecture.

5. The computer-implemented method of claim 4, wherein the second value is a memory address for the block of instructions, executable on the source instruction set computer architecture, that follows the second block of instructions in the order of execution.

6. The computer-implemented method of claim 5, wherein the step of appending the load instruction to the second block of instructions further includes appending a fetch instruction to the second block of instructions, the fetch instruction when executed obtains a memory address for the first block of instructions executable on the target instruction set computer architecture, said memory address for the first block of instructions executable on the target instruction set computer architecture is obtained from a translated address table.

7. The computer-implemented method of claim 6, wherein each entry of the translated address table is exclusive of a memory address for blocks of instructions executable on the source instruction set computer architecture.

8. A computer-readable medium having stored thereon a plurality of sequences of instructions, the plurality of sequences of instructions including a first sequence of instruction for enabling a first block of instructions to verify whether the first block of instructions follows a second block of instructions, the first sequence of instructions when executed by a processor, cause said processor to perform the steps of:

a) appending a compare instruction to the first block of instructions, the compare instruction when executed compares a first value from the first block of instructions with a second value from the second block of instructions, said second block of instructions preceding said first block of instructions in the order of execution; and b) appending a branching instruction to the first block of instructions, said branching instruction is executed in response to the first value being unequal to the second value, said branching instruction, when executed, branches to an alternative look-up routine to obtain a block of instructions that follows the second block of instructions in the order of execution.

9. The computer-readable medium of claim 8, where in the first sequence of instructions stored thereon further includes additional instructions, which when executed by a processor, cause the processor to perform the step of:

c) appending a load instruction to the second block of instructions, the load instruction when executed loads the second value in a memory location.

10. The computer-readable medium of claim 9, wherein the compare and branching instructions are appended to the first block of instructions when the first block of instructions is translated from being executable on a source instruction set computer architecture to being executable on the target instruction set computer architecture; and the load instruction is appended to the second block of instructions when the second block of instructions is translated from being executable on the source instruction set computer architecture to being executable on the target instruction set computer architecture.

11. The computer-readable medium of claim 10, wherein the first value is a memory address for the first block of instructions executable on the source instruction set computer architecture.

12. The computer-readable medium of claim 11, wherein the second value is a memory address for the block of instructions, executable on the source instruction set computer architecture, that follows the second block of instructions in the order of execution.

13. The computer-readable medium of claim 12, wherein the step of appending the load instruction to the second block of instructions further includes appending a fetch instruction to the second block of instruction, the fetch instruction when executed obtains a memory address for the first block of instructions executable on the target instruction set computer architecture, said memory address for the first block of instructions executable on the target instruction set computer architecture is obtained from a translated address table.

14. The computer-readable medium of claim 13, wherein each entry of the translated address table is exclusive of a memory address for blocks of instructions executable on the source instruction set computer architecture.

* * * * *